UNITED STATES PATENT OFFICE 2,289,029

ARYLSULPHONAMIDES OF THE BENZENE SERIES

Fritz Mietzsch, Josef Klarer, and Robert Behnisch, Wuppertal-Elberfeld, Germany, assignors to Winthrop Chemical Company, Inc., New York, N. Y., a corporation of New York.

No Drawing. Original application January 29, 1937, Serial No. 122,984. Divided and this application November 9, 1937, Serial No. 173,606. In Germany February 6, 1936

9 Claims. (Cl. 260—397.7)

This invention relates to arylsulphonamides of the benzene series.

U. S. Letters Patent No. 2,085,037 of June 29, 1937, U. S. applications for Letters Patent Serial Nos. 33,415, filed July 26, 1935, and 71,347, filed March 27, 1936, refer to azo compounds which display an excellent action in cases of streptococci and staphylococci infection of warm-blooded individuals. In accordance with the said inventions it is essential that one radical attached to the azo group of the azo compounds obtained is a cyclic radical which either contains a sulphonic acid amide group in the para-position to the azo group or several sulphonic acid amide groups in the nucleus. These compounds are preferably obtained by the use of diazotized amino benzene sulphonic acid amides which contain a sulphonic acid amide group in the para-position to the amino group or several sulphonic acid amide groups attached to the nucleus. Such amino benzene sulphonic acid amides in contradistinction to other substituted amino benzene sulphonic acid amides, have themselves a bactericidal action. Their practical use is however restricted since their salts with strong acids which come into consideration for practical use, are acid to Congo red and have a disagreeable taste. The compounds acetylated on the nuclearly bound amino group exhibit only a slight action in case of streptococci and staphylococci infections of warm-blooded individuals.

In accordance with the present invention highly active compounds which do not display the aforementioned disadvantages are obtained by preparing hydroxyacylamino- and aminoacylamino compounds, which may be substituted in the hydroxyl or amino group, of such sulphonic acid amides of the benzene series as either contain a sulphonic acid amide group in the para-position to the amino group attached to the nucleus or several sulphonic acid amide groups in the nucleus. Accordingly new products which are highly effective in case of streptococci and staphylococci infections are obtained by the manufacture of the compounds of the general formula:

In this formula $R^1$ stands for a radicle hereinafter typified as a "sulphonamide group" such as a para-sulphamide- or a disulphamide-substituted radical of the benzene series or for a corresponding N-alkyl-, N-alkylcarboxylic acid-, N-(4- to 5-membered)-alkylene, N-mononuclear arylalkyl or N-mononuclear cycloalkyl substituted radical. Such N-alkyl- and N-alkylcarboxylic acid-substituted sulphamide radicals are for instance mono- and di-methyl, -ethyl, -hydroxyethyl, -propyl and -butyl sulphamide groups and the N-sulphoglycide radical, N-(4- to 5-membered)-alkylene-substituted radicals are the N-sulpho-pyrrolidide- and the N-sulpho-piperidide radical, N-arylalkyl- and N-cycloalkyl-sulphamide radicals are the N-benzyl-, N-phenylethyl- and the N-cyclohexyl sulphamide radicals. Also the benzene nucleus bearing the sulphamide group(s) may contain substituents, for instance, alkyl groups, such as the methyl, ethyl and isopropyl group, alkoxy groups, such as the methoxy and ethoxy group, furthermore halogen atoms, hydroxyl and carboxylic acid groups.

$R^2$ in the above formula stands for the aminoacyl or hydroxy-acyl radical or for a derivative of such radical, the acyl group of which radical is attached to the N-atom; aminoacyl radicals are, for instance, aminoalkyl- and aminoarylcarboxylic acid and -sulphonic acid radicals, for instance, the aminoacetic-, aminopropionic-, aminobutyric-, aminocaproic-, mono- and di-amino-benzoic, -anisic acid, amino-benzene- and -toluene-sulphonic acids, the amino-carboxylic acid radical etc.; the amino group of the aminoacyl radicals may be substituted, an aliphatic hydrocarbon radicle which includes by alkyl, aralkyl and alkenyl groups, such as the methyl, ethyl, propyl, allyl, butyl, amyl and benzyl group, or by a 4- to 5-membered alkylene group with which the amino group forms a pyrolidine or piperidine ring, or by acyl groups, for instance, the acetyl, benzoyl, benzene- or toluene sulpho group, or by amino acyl radicals, such as those mentioned before; in the latter case $R^2$ represents an acylaminoacylamino radical. Equivalent to the aminoacyl groups are the radicals of carboxylic and sulphonic acids of nitrogeneous heterocyclic compounds, for instance pyridine and quinoline carboxylic and sulphonic acids. In the aminoalkyl carboxylic or sulphonic acid radicals the amino group may also be replaced by a quaternary heterocyclic nitrogen radical, as for instance in the pyridinium-chloride-N-acetyl radical

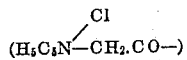
(H₅C₅N—CH₂.CO—)

and in the isoquinolinium-chloride-N-acetyl radical

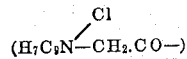
(H₇C₉N—CH₂.CO—)

Hydroxyacyl radicals are, for instance, the hydroxyacetyl, hydroxypropionyl, hydroxycrotonyl (H₃C—COH=CH—CO—), hydroxybenzoic and hydroxybenzenesulphonic acid radicals; the hydroxyl group of the hydroxyacyl radical may be etherified or esterified; such etherified and esterified radicals are, for instance, alkoxy-, aryloxy- and acyloxy-acyl radicals, such as methoxy-, ethoxy-, butyloxy-, acetoxy-, carbethoxy-, phenoxy-, ortho-chloro-phenoxy- and methyl-isopropyl - phenoxy-substituted acetyl, propionyl, benzoyl groups and ethane-, propane- and benzene sulphonic acid radicals.

R³ in the above formula is preferably hydrogen, but it may also stand for alkyl, such as methyl, ethyl, propyl, allyl, butyl and amyl, or for aralkyl, such as benzyl, or for aryl, such as phenyl.

The process for the manufacture of the compounds above specified is for example by substituting the amino group attached to the nucleus of benzene sulphonic acid amides which contain a sulphonic acid amide group in the para-position to the amino group attached to the nucleus or which contain several sulphonic acid amide groups in the nucleus, by hydroxy- or amino acyl radicals, which latter may, if desired, be substituted in the hydroxy- or amino group as indicated above. The process can also be carried out by using acylamino compounds of benzene sulphonic acid amides which contain a sulphonic acid amide group in the para-position to the acylamino group attached to the nucleus or which contain several sulphonic acid amide groups in the nucleus, and the acyl group of which is substituted by a reactive substituent, by replacing the said substituent by a hydroxy- or amino group which may be substituted, or by transforming it into one of these groups. For instance the halogen of halogenacylamino compounds of correspondingly substituted benzene sulphonic acid amides may be replaced by hydroxyl or amino or also for instance ether groups. Moreover nitro groups may be transformed into amino groups.

The new compounds can also be obtained by employing hydroxyacyl- or aminoacyl-derivatives of amines of the benzene series, which, if desired, may be substituted in the hydroxy or amino group and contain a sulphonic acid ester or halide group in the para-position to the substituted amino group or several groups in the nucleus, and transforming the latter groups by the action of ammonia or amines into sulphonamide groups.

The invention is further illustrated by the following examples without being restricted thereto:

*Example 1.*—20.8 grams of the hydrochloride of 4-aminobenzene sulphonic acid amide are dissolved in 200 ccs. of water, 30 grams of butoxyacetic anhydride are added and the mixture is heated on the water-bath while stirring. After a short time the butoxyacetylaminobenzene-4-sulphonic acid amide precipitates in colorless bright leaflets which are difficultly soluble in water and melt at 157° C.

By using instead of butoxyacetic anhydride 20 grams of methoxyacetic anhydride the methoxyacetyl-aminobenzene-4-sulphonic acid amide is obtained in colorless crystals which melt at 194° C.

The ethoxyacetylaminobenzene - 4 - sulphonic acid amide, obtained from 4-aminobenzene-sulphonic acid amide and ethoxy-acetic acid chloride in pyridine, forms when recrystallised from dilute methyl alcohol colorless crystals melting at 172° C., the ethoxyacetylaminobenzene-4-sulphonic acid-diethylamide when recrystallised from dilute methyl alcohol forms colorless crystals melting at 90–01° C., the ethoxyacetylaminobenzene-4-sulphonic acid benzylamide forms crystals melting at 108° C. when recrystallised from methylalcohol, the ethoxyacetylaminobenzene-4-sulphonic acid piperidide from methylalcohol forms crystals which melt at 150° C., the ethoxyacetylaminobenzene-3.5-di(sulphonic acid-dimethylamide) from ethylalcohol forms crystals melting at 152° C., the methoxyacetyl-diphenylamine-4-sulphonic acid amide from chloroform-methylalcohol forms crystals which decompose above 285° C.

*Example 2.*—20.8 grams of the hydrochloride of 4-amino-benzene-sulphonic acid amide are dissolved in 200 ccs. of water and 20 grams of 2-chlorophenoxyacetyl chloride are added. The mixture is heated on the water-bath while stirring and the reaction which is acid to Congo red is neutralized by the gradual addition of solid sodium acetate. The 2'-chloro-phenoxyacetyl-aminobenzene-4-sulphonic acid amide precipitating is filtered with suction. For purification from a slight quantity of 2-chlorophenoxyacetic acid which is still present it is extracted with cold 5% sodium carbonate solution. It melts at 232° C.

The correspondingly formed phenoxyacetyl-aminobenzene-4-sulphonic acid amide melts at 205° C., the 2'-isopropyl-5'-methyl-phenoxyacetylaminobenzene-4-sulphonic acid amide melts at 191° C., the phenoxypropylsulphonylaminobenzene-4-sulphonic acid amide.

(C₆H₅O.CH₂.CH₂.CH₂.SO₂.NH.C₆H₄.SO₂.NH₂)

melts at 145° C., the 2-methoxy-5-methyl-1-phenoxypropyl-sulphonylaminobenzene - 4 - sulphonic acid amide melts at 159° C.

*Example 3.*—20.8 grams of the hydrochloride of 4-amino-benzene-sulphonic acid amide are dissolved in 200 ccs. of water, 25 grams of 3-nitro-benzoyl chloride are added and the mixture is heated on the water-bath. With the gradual addition of solid sodium acetate the 3'-nitro-benzoylaminobenzene-4-sulphonic acid amide is formed. When a test portion of the reaction mixture, treated with hydrochloric acid, does not take up any sodium nitrite, the solution is filtered with suction and the precipitate dissolved in dilute caustic soda solution for purification, filtered with suction and separated by the addition of acetic acid. The new compound forms a white crystal powder which melts at 245° C. On reduction with iron in the presence of acetic acid the 3'-aminobenzoylaminobenzene - 4 - sulphonic acid amine is obtained therefrom which when recrystallized from very dilute hydrochloric acid melts at 275° C. with decomposition.

In an analogous manner the 3'-5'-diaminobenzoylaminobenzene-4-sulphonic acid amide may be obtained by starting with 3'.5'-dinitrobenzoylaminobenzene-4-sulphonic acid amide forming a light yellow powder melting at 285° C. which is soluble in warm dilute caustic soda solution with a red coloration. The monohydrochloride is obtained from dilute methyl alcohol melting at 289–290° C. Likewise the 3'-nitrobenzenesulphonylaminobenzene-4-sulphonic acid amide melting at 195° C. from methylalcohol may be reduced to the 3'-aminobenzenesulphonylaminobenzene-4-sulphonic acid amide melting at 168° C. from dilute ethylalcohol.

Example 4.—41.7 grams of the hydrochloride of 4-aminobenzenesulphonic acid amide are dissolved in 400 ccs. of water and transformed into the chloracetylamihobenzene-4-sulphonic acid amide by the gradual addition of 30 grams of chloracetylchloride and solid sodium acetate. The chloracetylaminobenzene-4-sulphonic acid amide crystallizes from methanol in colorless needles which melt at 212° C. By treatment with aqueous ammonia the aminoacetylaminobenzene-4-sulphonic acid amide is obtained therefrom, melting at 217° C. The hydrochloride when recrystallized from dilute alcohol melts at 287° C.

By treating the chloroacetyl compound with butylamine in boiling alcohol the butylaminoacetylaminobenzene-4-sulphonic acid amide is obtained which after recrystallisation from methyl alcohol melts at 167° C.; by treatment with ethylamine the ethylaminoacetylaminobenzene-4-sulphonic acid amide, the hydrochloride of which melts at 247° C. is obtained; by treatment with propylamine the propylaminoacetylaminobenzene-4-sulphonic acid amide is obtained which when recrystallized from methyl alcohol melts at 181° C.; by treatment with allylamine the allylaminoacetylaminobenzene-4-sulphonic acid amide is obtained which when recrystallized from methyl alcohol melts at 193° C.; by treatment with piperidine the piperidoacetylaminobenzene-4-sulphonic acid amide is obtained which when recrystallized from methyl alcohol melts at 204° C.; by treatment with diethylamine in a closed tube at 100° C. the diethylaminoacetylaminobenzene-4-sulphonic acid amide is obtained which after reprecipitation by means of hydrochloric acid and ammonia melts at 150° C. The latter compound may also be obtained by heating 4-aminobenzenesulphonic acid amide with diethylaminoacetic ester in an oil bath for 3 hours to 180–200° C. By treating the chloracetyl compound with pyridine on the water-bath the quaternary pyridiniumchloride-acetylaminobenzene-4-sulphonic acid amide is obtained in the form of yellowish crystals melting at 256° C.; by treatment with isoquinoline the quaternary isoquinoliniumchloride-acetylaminobenzene-4-sulphonic acid amide is obtained in the form of yellowish crystals melting at 250° C.

When using instead of the chloroacetylaminobenzene-4-sulphonic acid amide the β-chloropropionylaminobenzene-4-sulphonic acid amide (colorless crystals from methyl alcohol melting at 225–226° C.) the butylaminopropionylaminobenzene-4-sulphonic acid amide (from dilute methyl alcohol leaflets melting at 163° C.) and the pyridiniumchloride-propionylaminobenzene-4-sulphonic acid amide (yellow granular crystals melting at 223° C.) are obtained.

When using the bromoisocaproylaminobenzene-4-sulphonic acid amide (colorless scales melting at 151° C.) the butylaminoisocaproylaminobenzene-4-sulphonic acid amide (colorless crystals melting at 177° C.) is obtained.

When starting with chloroacetylaminobenzene-4-sulphonic acid monomethylamide (colorless crystals from methylalcohol melting at 137° C.) the pyridiniumchloride-acetylaminobenzene-4-sulphonic acid methylamide (yellow crystals from water melting at 272° C.) is obtained.

When starting with chloroacetylaminobenzene-4-sulphonic acid diethylamide (colorless crystals from methyl alcohol melting at 114° C.) the pyridiniumchloride-acetylaminobenzene-4-sulphonic acid diethylamide (crystals from alcohol melting at 158° C.) is obtained.

When starting with chloroacetylaminobenzene-4-sulphonic acid butylamide, melting at 153° C., the butylaminoacetylaminobenzene-4-sulphonic acid butylamide, melting at 85° C., can be prepared therefrom. When using chloroacetylaminobenzene-4-sulphonic acid hydroxyethylamide, melting at 147° C., the butylaminoacetylaminobenzene-4-sulphonic acid hydroxyethylamide, melting at 133° C. is obtained. From the chloroacetylaminobenzene-4-sulphonic acid benzylamide, melting at 165° C., the butylaminoacetylaminobenzene-4-sulphonic acid-benzylamide melting at 117° C. may be obtained. From the 2-ethoxy-5-methyl-1-chloroacetylaminobenzene-4-sulphonic acid amide, melting at 207° C., the 2-ethoxy-5-methyl-1-butylaminoacetylaminobenzene-4-sulphonic acid amide, melting at 154° C., and from the chloroacetylaminobenzene-3.5-di-sulphonic acid dimethylamide, melting at 186° C., the butylaminoacetylaminobenzene-3.5-di-sulphonic acid dimethylamide, melting at 107° C., the pyridiniumchloride-acetylaminobenzene-3.5-di-sulphonic acid dimethylamide, melting at 260° C., may be obtained.

Example 5.—20 grams of chloroacetylaminobenzene-4-sulphonic acid amide are boiled with 200 ccs. of 20% sodium acetate solution while stirring for 12 hours. After cooling the solution is filtered with suction and recrystallized from boiling water. In this manner the hydroxyacetylaminobenzene-4-sulphonic acid amide is obtained in the form of colorless crystals melting at 190° C.

20 grams of 4-aminobenzenesulphonic acid amide are heated with 100 ccs. of lactic acid on the oil bath for 3 hours at 110–120° C., whereby the water formed is removed now and then by filtering with suction. On cooling the alpha-hydroxypropionylaminobenzene-4-sulphonic acid amide precipitates and is obtained after redissolving from boiling water in the form of colorless leaflets melting at 187° C. The compound is fairly soluble in water.

50 grams of 4-aminobenzenesulphonic acid amide are heated with 150 grams of acetoacetic acid ethyl ester for 4 hours on the oil bath, whereby all is dissolved. The acetoacetylaminobenzene-4-sulphonic acid amide is precipitated from the cooled solution with ether and recrystallized from dilute alcohol. The new compound which may also be taken as the β-hydroxycrotonylaminobenzene-4-sulphonic acid amide melts at 189° C.

Example 6.—17.2 grams of 4-aminobenzenesulphonic acid amide are slowly reacted in 50 ccs. of pyridine with 12.5 grams of chloroformic acid ethyl ester and the solution heated to about 50° C. for 15 minutes. On neutralizing with hydrochloric acid while cooling the carbethoxyaminobenzene-4-sulphonic acid amide is precipitated. After recrystallisation from alcohol it forms colorless prisms melting at 238° C.

Example 7.—100 grams of 4-(4'-acetylaminobenzenesulphonamido)-benzene-sulphonamide are boiled with 500 ccs. of hydrochloric acid (spec. gravity 1.08) until complete solution. The precipitate crystallizing on cooling is filtered with suction and dissolved in dilute caustic soda solution. By the addition of saturated aqueous ammonium-chloride solution the 4-(4'-aminobenzenesulphonamido)-benzenesulphonamide is separated which, when recrystallized from boiling water, forms snow-white crystals melting at 131° C.

Corresponding compounds substituted in the end position of the sulphonamide group are obtained in the following manner:

233.5 grams of 4-acetylaminobenzenesulphonic acid chloride, 186 grams of 4-aminobenzenesulphonmono-methylamide and 100 ccs. of acetone are heated to boiling with 1000 grams of sodium bicarbonate for one hour. Then the acetone is blown off with steam and the solid residue dissolved in dilute caustic soda solution. From the solution by the addition of saturated aqueous ammonium chloride solution the crude 4-(4'-acetylaminobenzensulphonamido)-benzenesulphonmonomethylamide is precipitated which, when recrystallized from boiling alcohol, forms white crystals which melt at 218° C. 100 grams of the said compound are boiled with 600 ccs. of hydrochloric acid (spec. grav. 1.08) until solution occurs and are then caused to crystallize. The separated hydrochloric acid salt of the 4-(4'-aminobenzenesulphonamido) - benzenesulphon - monomethylamide is filtered with suction and washed with hydrochloric acid. It is brought in solution with boiling water. On cooling the free base crystallizes therefrom with hydrolysis in the form of white crystals melting at 141° C.

From 233.5 grams of 4-acetylaminobenzenesulphonic acid chloride and 200 grams of 4-aminobenzenesulphonmonoethylamide there are obtained in the manner described above first the 4 - (4' - acetylaminobenzenesulphonamido) - benzenesulphonmonoethylamide in colorless crystals melting at 183° C. and therefrom the hydrochloric acid salt of the 4-(4'-aminobenzenesulphonamido) - benzenesulphon - monoethylamide. The free base yields white crystals melting at 190° C.

From 233.5 grams of 4-acetylaminobenzenesulphonic acid chloride and 228 grams of 4-aminobenzenesulphondiethylamide there are obtained the 4 - (4' - acetylaminobenzenesulphonamido) - benzenesulphondiethylamide melting at 225–228° C. and therefrom the hydrochloric acid salt of the 4 - (4' - aminobenzenesulphonamido) - benzenesulphondiethylamide as a difficultly soluble precipitate which by the addition of acetic acid can be dissolved. The free base, when recrystallized from alcohol, melts at 164° C. The 4-(4'-aminobenzenesulphonamido) - benzenesulphondimeth - ylamide prepared according to the same working methods melts at 194° C. when recrystallized from dilute alcohol.

The sodium salt of the said compound is readily soluble in water, the potassium salt a little more difficultly and is obtained from water in beautiful crystals.

In a corresponding manner there are obtained: The 4-(4'-aminobenzenesulphonamido)-benzenesulphonbutylamide melting at 183° C. (from dilute ethylalcohol), the 4-(4'-aminobenzenesulphonamido) - benzenesulphonhydroxyethylamide melting at 145° C. (from dilute ethylalcohol), the 4-(4'acetylaminobenzenesulphonamido)-benzenesulphon-di-hydroxyethyl-amide melting at 121° C. (from water), the 4-(4'-aminobenzenesulphonamido) - benzenesulphon - di - hydroxyethylamide melting at 124° C. (from aqueous acetone), the compound $H_2N.O_2S(4).C_6H_4(1)NH.SO_2.C_{10}H_8N$ (radical of the quinaldine) melting at 202° C. (from ethylalcohol), the compound $H_2N.O_2S(4).C_6H_4.(1)NH.SO_2(4').C_6H_4.$
$(1').NH.SO_2(4'').C_6H_4.(1'')NH_2$ melting at 258° C., the compound $(CH_3)_2N.O_2S(4).C_6H_4.(1)NH.SO_2(4').C_6H_4.$
$(1').NH.SO_2(4'').C_6H_4.(1'').NHCOCH_3$ melting at 125° C. (from aqueous acetone), the compound $(CH_3)_2N.O_2S(4).C_6H_4.(1)NH.SO_2(4').C_6H_4.$
$(1').NH.SO_2(4'').C_6H_4.(1'')NH_2$ melting at 124° C. (from aqueous acetone), the 4-(4'-dimethylamino-acetylaminobenzene-
sulphonamido)-benzenesulphondimethylamide melting at 113° C. (from dilute ethylalcohol), the 4-(4'-butylaminoacetylaminobenzenesul-
phonamido)-benzenesulphondimethylamide melting at 200° C. (from dilute ethylalcohol), the 4-(4'methylsulphonylaminobenzenesul-
phonamido)-benzenesulphondimethylamide melting at 192° C. (from dilute methyl alcohol), the 4-(4'-dimethylaminobenzenesulphonamido)-benzenesulphonamide melting at 213° C. (from dilute methylalcohol), the 4-(4'-dimethylamino-benzenesulphonamido)-benzenesulphondimethyl-amide melting at 218° C. (from dilute methyl alcohol), the 2-methyl-5-methoxy-4-(4'-amino-benzenesulphonamido) - benzenesulphonamide melting at 212° C. (from dilute methyl alcohol), the 4-(4'-aminobenzenesulphonamido)-benzene-sulphondimethylamide-3-carboxylic acid melting at 246–247° C., which yields a sodium salt which is difficulty soluble in water, but a diethylamine salt which is readily soluble, the 4-(4'-aminobenzenesulphonamido) - benzenesulphondiethyl - amide-3-carboxylic acid melting at 205–206° C., which yields a sodium salt which is difficultly soluble in water but a diethanolamine salt which is readily soluble, the 5-(4'-acetylamino-benzenesulphonamido)-benzene - 1.3 - di-sulphondimethylamide melting at 174° C. (from dilute methylalcohol), the 5-(4'-aminobenzenesulphonamido)-benzene-1.3-di-sulphondimethylamide melting at 181° C. (from 50% acetic acid), the 4-(4'aminobenzenesulphonamido)-benzene sulphonamide-N-acetic acid $(H_2N-(4')-C_6H_4-SO_2NH-(4)-$
$C_6H_4-SO_2NH.CH_2-COOH$ melting at 187° C. (from a small quantity of water) and the 1-amino-benzene-3.5-di-[sulphon - (4' - dimethylaminosulphonyl) - anilide] melting at 158° C. (from aqueous acetone); furthermore the 4-(3'.4'-dimethoxybenzenesulphonamido)-benzenesulphonamide, melting at 155° C. (from dilute alcohol), the 4-(3'.4'-dimethoxybenzenesulphonamido) - benzenesulphonmonomethylamide melting at 168° C. (from dilute acetic acid) and the 4-(3'.4'-dimethoxybenzenesulphonamido)- benzenesulphondimethyl - amide melting at 201° C. (from dilute acetic acid).

Example 8.—28 grams of ethoxyacetylaminobenzene-4-sulphonic acid (obtained by the action of ethoxyacetyl-chloride upon aminobenzene-4-sulphonic acid) are mixed with 21 grams of phosphorus pentachloride while stirring until the mixture has become liquid and the evolution of hydrochloric acid has ceased. It is taken up with chloroform and ice while separating the chloroform, dried with sodium sulphate and reacted with methylalcoholic ammonia. After evaporation of the solvents the residue is extracted with 5% hydrochloric acid and the undissolved part recrystallized from methylalcohol. The ethoxyacetylaminobenzene-4-sulphonic acid amide melts at 172° C. When causing instead of ammonia a methylalcoholic solution of cyclohexylamine to react upon the solution of the acid chloride the ethoxyacetylaminobenzene-4-sulphonic acid cyclohexylamide melting at 133° C. is obtained.

This application is a division of our copending application for Letters Patent Serial No. 122,984, filed Jan. 29, 1937.

We claim:

1. Compounds of the following general formula

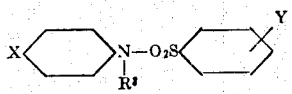

wherein X is a sulphonamide group, $R^3$ is a member of the group consisting of hydrogen, alkyl, aryl and aralkyl groups, and Y is a member of the group consisting of

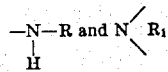

R is a member of the group consisting of hydrogen, aliphatic hydrocarbon and aliphatic carboxylic and mononuclear aryl carboxylic and sulphonic acyl radicals and $R_1$ is a member of the group consisting of 4 and 5 membered alkylene groups.

2. The compounds of the general formula:

wherein X stands for a sulphamide group and $R^2$ stands for an aminoarylsulphonyl radical of the benzene series.

3. The compounds of the general formula:

wherein X stands for a sulphamide group and $R^2$ stands for a para-aminoarylsulphonyl radical of the benzene series.

4. The compounds of the general formula:

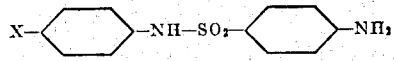

wherein X stands for a sulphamide group.

5. 4-(4'-aminobenzenesulphonamide) - benzenesulphonamide.

6. 4-(4'-aminobenzenesulphonamido) - benzenesulphonmethylamide.

7. 4-(4'-aminobenzenesulphonamido) - benzenesulphondimethylamide.

8. As new chemical compounds, sulphanilamides having the general formula

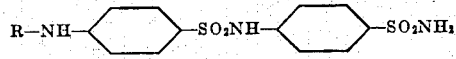

wherein R is one of the group consisting of hydrogen and

9. A method of producing 4-(4'-aminobenzene - sulphonamido) - benzene sulphonamide which comprises hydrolizing 4-(4'-acetylaminobenzene-sulphonamido) - benzene-sulphonamide and recovering the disulphanilamide.

FRITZ MIETZSCH.
JOSEF KLARER.
ROBERT BEHNISCH.